US006762795B1

(12) United States Patent
Chen et al.

(10) Patent No.: US 6,762,795 B1
(45) Date of Patent: Jul. 13, 2004

(54) BI-DIRECTIONAL CAPABLE BUCKET BRIGADE CIRCUIT

(75) Inventors: Leonard P. Chen, Santa Barbara, CA (US); Howard T. Chang, Santa Barbara, CA (US); Eileen M. Herrin, Goleta, CA (US); Mary J. Hewitt, Santa Barbara, CA (US); John L. Vampola, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/479,703

(22) Filed: Jan. 7, 2000

(51) Int. Cl.[7] .................................................. H04N 3/14
(52) U.S. Cl. ..................................... 348/295; 348/308
(58) Field of Search .............................. 377/61, 57, 58, 377/59, 60; 348/295, 294; 257/251

(56) References Cited

U.S. PATENT DOCUMENTS 5,315,114 A * 5/1994 Kansy ........................ 250/332
6,133,596 A   10/2000 Woolaway
6,459,077 B1 * 10/2002 Hynecek .................. 250/208.1

* cited by examiner

Primary Examiner—Ngoc-Yen Vu
Assistant Examiner—Paul W. Myers, IV
(74) Attorney, Agent, or Firm—William C. Schubert; Glenn H. Lenzen, Jr.

(57) ABSTRACT

A time delay integration circuit in which a number of unit cell inputs (101, 103, 105, 107) along with their respective switches (170, 171, 172, 173) are input to a bi-directional BBD circuit (110). The BBD circuit performs an SCA TDI with reduced ROIC circuitry and compatibility with standard LSI processing. The bi-directional BBD circuit has numerous pairs of MOSFETs (111, 112; 113, 114; 115, 116; 117, 118; 119, 120; 121, 122; 123, 124; 125, 126; 127, 128; 129, 130; 131, 132; 133, 134; 135, 136; 137, 138; 139, 140; 141, 142) connected in series and numerous storage capacitors (151, 152, 153, 154, 155, 156, 157, 158, 159, 160, 161, 162, 163, 164, 165, 166) having one of their terminals respectively connected between each of the MOSFET pairs and the other of their terminals alternately connected to clock phases Ø1 and Ø2. The gates of the MOSFETs in each pair are separated from the clock phases Ø1 and Ø2 and function respectively as screen gate and transfer clock for one direction of charge flow, and as transfer clock and screen gate for the other direction of charge flow. Transfer direction is changed by switching which MOSFET in a pair becomes clocked as a transfer gate and which becomes a screen gate.

20 Claims, 6 Drawing Sheets

| UNIT INPUT CELL | INPUT CHARGE | CAPACITOR | t 0 | t 1 | t 2 | t 3 |
|---|---|---|---|---|---|---|
| | | 151 | - | - | - | - |
| 101 | G (1) | 152 | - | G (1) | G (1) | - |
| | | 153 | F (1) | F (1) | - | G (1) |
| | | 154 | - | - | F (1) | - |
| | | 155 | E (1) | E (1) | - | F (1) |
| 103 | E (2) | 156 | - | E (2) | E (1+2) | - |
| | | 157 | D (1+2) | D (1+2) | - | E (1+2) |
| | | 158 | - | - | D (1+2) | - |
| | | 159 | C (1+2) | C (1+2) | - | D (1+2) |
| 105 | C (3) | 160 | - | C (3) | C (1+2+3) | - |
| | | 161 | B (1+2+3) | B (1+2+3) | - | C (1+2+3) |
| | | 162 | - | - | B (1+2+3) | - |
| | | 163 | A (1+2+3) | A (1+2+3) | - | B (1+2+3) |
| 107 | A (4) | 164 | - | A (4) | A (1+2+3+4) | - |
| | | 165 | - | - | - | A (1+2+3+4) |
| | | 166 | - | - | - | - |

FIG. 4

| UNIT INPUT CELL | INPUT CHARGE | CAPACITOR | t 4 | t 5 | t 6 | t 7 |
|---|---|---|---|---|---|---|
| | | 151 | - | - | - | - |
| 101 | H (1) | 152 | - | H (1) | H (1) | - |
| | | 153 | G (1) | G (1) | - | H (1) |
| | | 154 | - | - | G (1) | - |
| | | 155 | F (1) | F (1) | - | G (1) |
| 103 | F (2) | 156 | - | F (2) | F (1+2) | - |
| | | 157 | E (1+2) | E (1+2) | - | F (1+2) |
| | | 158 | - | - | E (1+2) | - |
| | | 159 | D (1+2) | D (1+2) | - | E (1+2) |
| 105 | D (3) | 160 | - | D (3) | D (1+2+3) | - |
| | | 161 | C (1+2+3) | C (1+2+3) | - | D (1+2+3) |
| | | 162 | - | - | C (1+2+3) | - |
| | | 163 | B (1+2+3) | B (1+2+3) | - | C (1+2+3) |
| 107 | B (4) | 164 | - | B (4) | B (1+2+3+4) | - |
| | | 165 | A (1+2+3+4) | A (1+2+3+4) | - | B (1+2+3+4) |
| | | 166 | - | - | A (1+2+3+4) | - |

FIG. 5

| UNIT INPUT CELL | INPUT CHARGE | CAPACITOR | t 0 | t 1 | t 2 | t 3 |
|---|---|---|---|---|---|---|
| | | 165 | - | - | - | - |
| 107 | G (1) | 164 | - | G (1) | G (1) | - |
| | | 163 | F (1) | F (1) | - | G (1) |
| | | 162 | - | - | F (1) | - |
| | | 161 | E (1) | E (1) | - | F (1) |
| 105 | E (2) | 160 | - | E (2) | E (1+2) | - |
| | | 159 | D (1+2) | D (1+2) | - | E (1+2) |
| | | 158 | - | - | D (1+2) | - |
| | | 157 | C (1+2) | C (1+2) | - | D (1+2) |
| 103 | C (3) | 156 | - | C (3) | C (1+2+3) | - |
| | | 155 | B (1+2+3) | B (1+2+3) | - | C (1+2+3) |
| | | 154 | - | - | B (1+2+3) | - |
| | | 153 | A (1+2+3) | A (1+2+3) | - | B (1+2+3) |
| 101 | A (4) | 152 | - | A (4) | A (1+2+3+4) | - |
| | | 151 | - | - | - | A (1+2+3+4) |

FIG. 6

BI-DIRECTIONAL CAPABLE BUCKET BRIGADE CIRCUIT

BI-DIRECTIONAL CAPABLE BUCKET BRIGADE CIRCUIT

This invention was made with Government support under contract awarded by the Government. The Government has certain rights in this invention.

BACKGROUND OF THE INVENTION

1. Field of the Invention

The present invention relates to circuits useful in processing the output of image sensing arrays. More specifically, the present invention relates to Time Delay Integration ("TDI") circuits useful in processing the output of image sensing arrays.

2. Description of the Related Art

The Time-Delay-Integration ("TDI") architecture is typically found in high speed digital image sensing devices such as Charge Coupled Device ("CCD") image sensors to achieve satisfactory sensitivity. It has utility with many various types of image sensing arrays variously sensitive to, for example, the infrared, visible light, and X-ray wavelengths. In an image sensing device with a TDI architecture, an image is optically scanned so that each part of the image is sensed with different parts, typically lines, of the image sensing array in a synchronized, delayed manner. The plural outputs over time of the image sensing array for each part of the image are summed, thereby improving the sensitivity and spatial resolution of the image sensing device. One measure of performance of image sensing devices is the Modulation Transfer Function ("MTF"), which is defined as the ratio of the modulation of the output signal to the modulation of the input signal, versus spatial frequency.

Typically, the TDI circuits are implemented in a type of silicon-based integrated circuit known as a Read-Out Integrated Circuit ("ROIC"), which is combined with the sensing array to form a Sensor Chip Assembly ("SCA"). SCAs are used in a variety of digital imaging systems, including, for example, night vision cameras, surveillance cameras, remote imaging cameras, and manufacturing line inspection cameras, and are suitable even for standard army dewar assembly ("SADA") type applications and three color activities. Multiple color band activities are scanning systems which incorporate more than one spectral band, or color, on a SCA. Each of the colors is defined by a bank of sensing elements on which a single spectral color is incident. SCAs are particularly useful when the sensing array is made of a non-silicon semiconductor material, which is typical because non-silicon semiconductor materials are inherently sensitive to various useful portions of the electromagnetic spectrum. Image information in the form of electrical charge is produced in the imaging array. The charge is collected and processed by the typically silicon-based ROIC. SCAs are manufactured using a variety of well known techniques, ranging from fabricating the sensing array separately from the ROIC and mounting the sensing array and ROIC on a common substrate or a common printed circuit board, to mounting the sensing array substrate on the ROIC substrate and then fabricating the sensing array.

TDI has been performed with both voltage transfer devices and charge transfer devices. Charge coupled devices ("CCDs") transfer charge by modulating the surface potential in a semiconductor. For example, time delay integration may be performed in a SCA TDI architecture using a CCD array in a "side rider" configuration. Bucket brigade devices ("BBDs") move charge by utilizing the threshold barrier formed by MOSFETs. Time delay integration can be implemented using standard bucket brigade ("BBD") circuits.

CCDs and BBDs preferably should have a bidirectional capability for certain types of applications such as, rotating mirror scanning arrays. The conventional approach to achieve bi-directionality has been to use two bucket brigade structures, one for each direction, or two CCDs, or two CCDs with switched or reconfigurable inputs, which read the unit cell outputs. The use of reconfigurable inputs requires multiplexer circuitry to place the unit cell outputs onto a single column bus, a programmable clock to synchronize the column bus output to the CCD bucket inputs, and demultiplexer circuitry to place the synchronized column bus signal into the CCD buckets. The increased amount of additional circuitry used to achieve bi-directionality in these conventional approaches is undesirable.

Hence, a need exists in the art for a TDI circuit that is useful for bidirectional processing of the output of image sensing arrays without using switched or reconfigurable inputs, and that has reduced ROIC circuitry relative to the ROIC circuitry required in the side rider CCD implementation.

SUMMARY OF THE INVENTION

The need in the art is addressed by the present invention, which in one embodiment is a time delay integration circuit comprising a plurality of serially coupled circuit groups, each comprising at least; a first charge transfer path segment having first and second serially coupled gates; a second charge transfer path segment having first and second serially coupled gates, the first gate of the second charge transfer path being coupled to the second gate of the first charge transfer path; a first capacitor having a first terminal coupled to the first gate of the first charge transfer path segment and a second terminal; and a second capacitor having a first terminal coupled to the first gate of the second charge transfer path segment and a second terminal; a plurality of imaging sensor unit cell inputs controllably coupled, respectively, to the first terminals of the second capacitors; a screen voltage node controllably coupled in a first circuit mode to the first gates and in a second circuit mode to the second gates; a first phase clock node coupled to the second terminals of the first capacitors and controllably coupled in the first circuit mode to the second gates of the second charge transfer path segments and in the second circuit mode to the first gates of the first charge transfer path segments; and a second phase clock node coupled to the second terminals of the second capacitors and controllably coupled in the first circuit mode to the second gates of the first charge transfer path segments and in the second circuit mode to the first gates of the second charge transfer path segments.

Another embodiment of the invention is a two sample per dwell time delay integration circuit comprising a plurality of serially coupled circuit groups, each comprising a first charge transfer path segment having first and second serially coupled gates; a first capacitor having a first terminal coupled to the first gate of the first charge transfer path segment and a second terminal; a second charge transfer path segment having first and second serially coupled gates, the first gate of the second charge transfer path being coupled to the second gate of the first charge transfer path; a second capacitor having a first terminal coupled to the first gate of the second charge transfer path segment and a second terminal; a third charge transfer path segment having first and second serially coupled gates, the first gate of the third charge transfer path being coupled to the second gate of the second charge transfer path; a third capacitor having a first terminal coupled to the first gate of the third charge transfer path segment and a second terminal; a fourth charge transfer path segment having first and second serially coupled gates, the first gate of the fourth charge transfer path being coupled to the second gate of the third charge transfer path; and a fourth capacitor having a first terminal coupled to the first gate of the fourth charge transfer path segment and a second terminal; a plurality of imaging sensor unit cell inputs controllably coupled, respectively, to the first terminals of the second capacitors; a screen voltage node controllably coupled in a first circuit mode to the first gates and in a second circuit mode to the second gates; a first phase clock node coupled to the second terminals of the first and third capacitors and controllably coupled in the first circuit mode to the second gates of the second and fourth charge transfer path segments and in the second circuit mode to the first gates of the first and third charge transfer path segments; and a second phase clock node coupled to the second terminals of the second and fourth capacitors and controllably coupled in the first circuit mode to the second gates of the first and third charge transfer path segments and in the second circuit mode to the first gates of the second and fourth charge transfer path segments.

Another embodiment of the invention is a method of time delay integration of image sensor charges, comprising storing a charge on a first capacitor; acquiring a first image sensor charge; transferring the first image sensor charge to a second capacitor; transferring the charge on the first capacitor from the first capacitor to the second capacitor in a first direction along a first charge transfer path to add the charge on the first capacitor to the first image sensor charge, thereby obtaining a first accumulated charge; transferring the first accumulated charge from the second capacitor to a third capacitor in the first direction along a second charge transfer path to store the first accumulated charge; acquiring a second image sensor charge, the second image sensor charge being a time delayed version of the first image sensor charge; transferring the second image sensor charge to a fourth capacitor; transferring the first accumulated charge from the third capacitor to the fourth capacitor in the first direction along a third charge transfer path to add the first accumulated charge to the second image sensor charge, thereby obtaining a second accumulated charge; and transferring the second accumulated charge from the fourth capacitor to a fifth capacitor in the first direction along a fourth charge transfer path to store the second accumulated charge.

BRIEF DESCRIPTION OF THE DRAWINGS

FIGS. 4–6 are tables of charge transfers useful in understanding the operation of the circuit of FIG. 3.

DESCRIPTION OF THE INVENTION

Illustrative embodiments and exemplary applications will now be described with reference to the accompanying drawings to disclose the advantageous teachings of the present invention.

Figure 1:
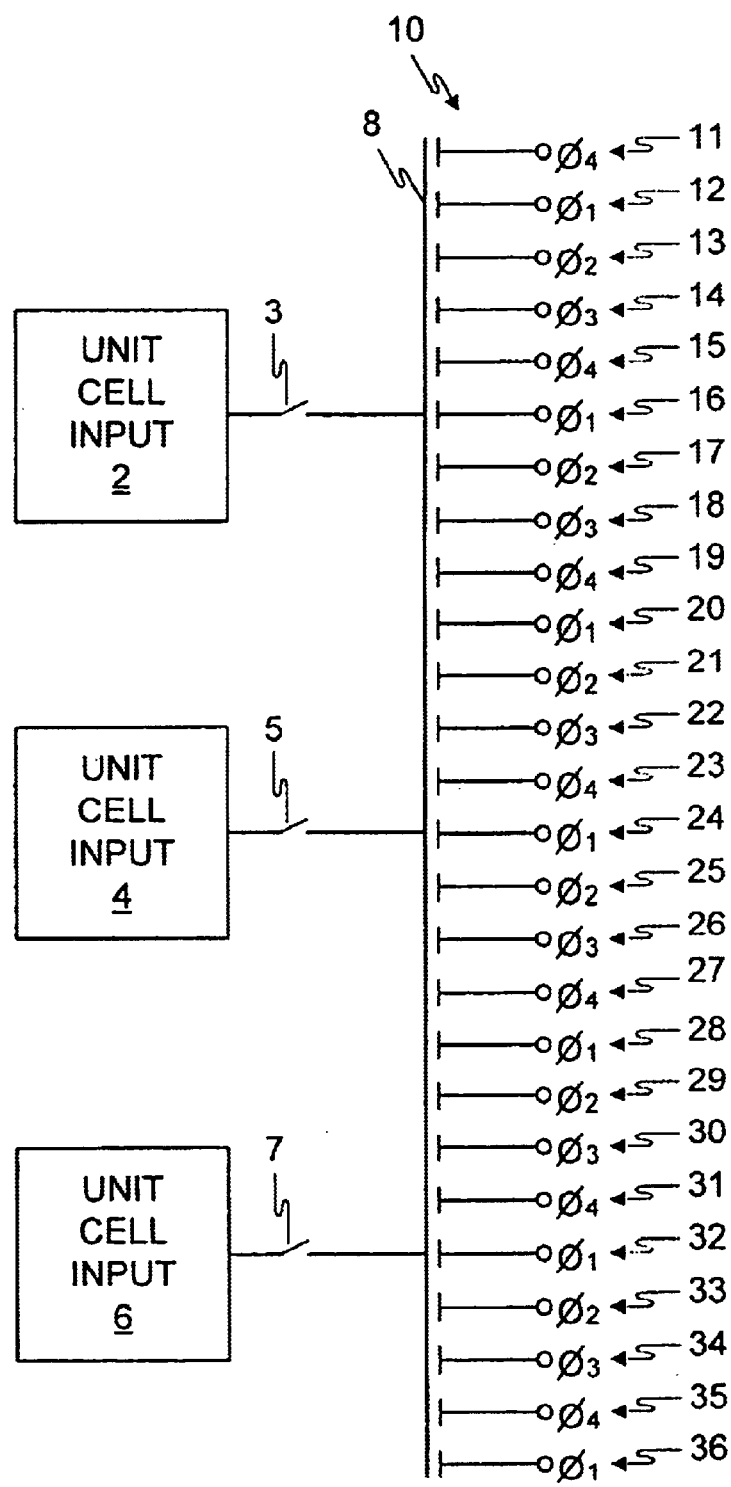
FIG. 1 is a four-phase CCD circuit diagram.

FIG. 1 shows an illustrative segment 10 of a CCD in a "side rider" configuration for a 2 sample per dwell implementation; see, e.g., "High Performance InSb Scanning Sensor Chip with 26 In TDI," Proceedings of the IRIS, August, 1992. The side rider CCD implementation operates by injecting charge into every other $\emptyset_1$ bucket of the CCD circuit from the multiplexed unit cell outputs. Segment 10 includes gates 11–36, which are alternately clocked by clock phases $\emptyset_1\emptyset_2$, $\emptyset_3$, and $\emptyset_4$. One complete clocking cycle of $\emptyset_1\emptyset_2$, $\emptyset_3$, and $\emptyset_4$ constitutes an addition, transfer, and storage cycle. One typical scheme to operate such a CCD implementation is described as follows. At the beginning of an addition, transfer, and storage cycle the wells under the gates controlled by $\emptyset_1$ are empty and the wells under the gates controlled by $\emptyset_3$ have charge stored from the previous cycle. The barriers under the gates controlled by $\emptyset_2$ and $\emptyset_4$ are at a high potential in order to isolate the $\emptyset_0$, and $\emptyset_3$ gates. Unit cell inputs 2, 4, and 6 inject their respective signals into the empty CCD wells under the gates controlled by clock phase $\emptyset_1$, namely gates 16, 24, and 32. This is done by any of various techniques, from charge sharing to fill/spill injectors. $\emptyset_4$ is then appropriately clocked such that the barrier under its respective gates is lowered, and the $\emptyset_3$ gates are clocked such that the charges that is stored under these gates are transferred and added to the charges that are under the $\emptyset_1$ gates. The barrier under the gate controlled by $\emptyset_4$ is raised, and the potential under the now empty $\emptyset_3$ wells is lowered. The barrier under $\emptyset_2$ is now lowered to allow the charges under the $\emptyset_1$ gates to be transferred to the $\emptyset_3$ gates, and $\emptyset_1$ is clocked to complete the transfer. The addition, transfer, and storage cycle is complete once the barrier under the $\emptyset_2$ gates is raised and the potential under the $\emptyset_1$ gates is lowered. The summed charges are now stored in the wells under the gates controlled by $\emptyset_3$, and the wells under the $\emptyset_1$ gates are once again empty.

Figure 2:
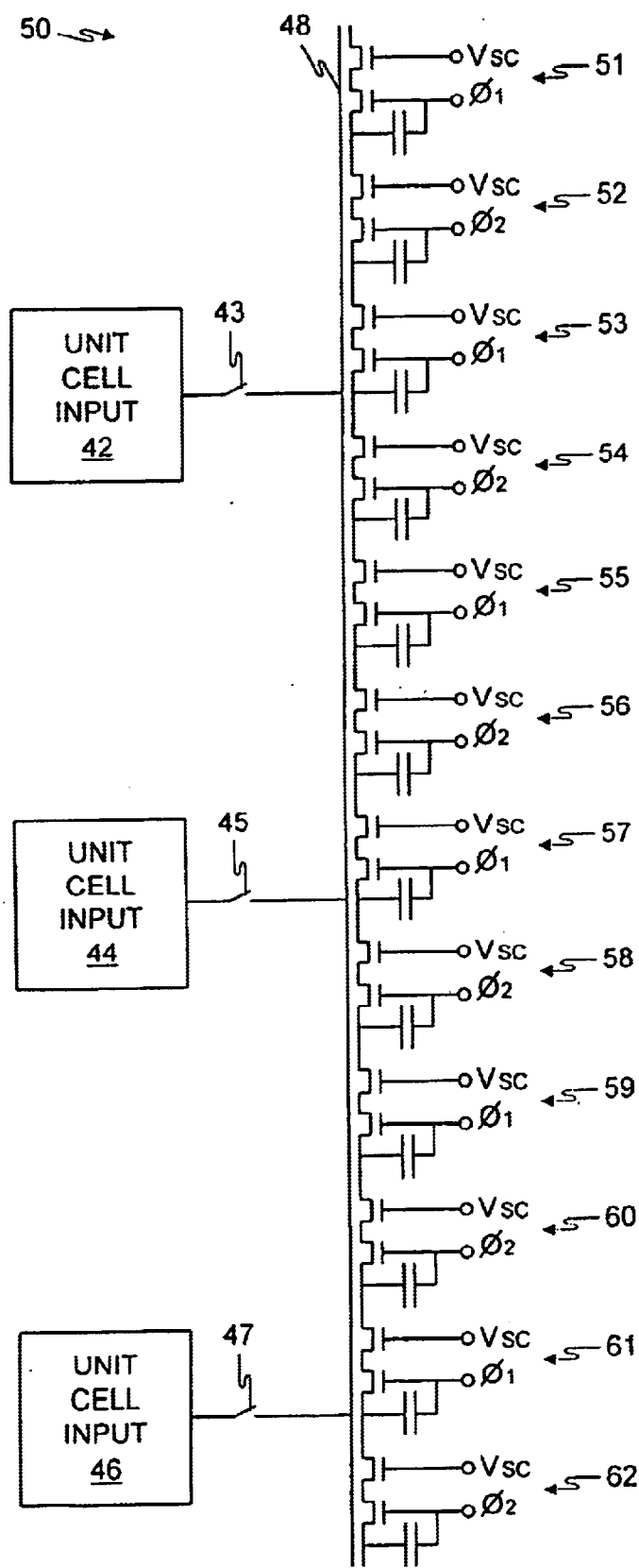
FIG. 2 is a conventional BBD circuit diagram.

FIG. 2 shows an illustrative segment 50 of a bucket brigade device, which has a number of MOS transistor pairs combined with respective capacitors. The MOS transistor pairs have respective screen gates to which $V_{SC}$ is applied, and transfer gates alternately clocked by clock phase $\emptyset_1$ and clock phase $\emptyset_2$. The capacitors also are clocked alternately by clock phase $\emptyset_1$ and clock phase $\emptyset_2$. One complete clocking cycle of $\emptyset_1$, and $\emptyset_2$ constitutes an addition, transfer, and storage cycle. One typical scheme to operate such a BBD implementation is described as follows. At the beginning of an addition, transfer, and storage cycle the capacitor node connected to the drain of the transistor controlled by $\emptyset_1$ is at its reset potential. The transistors controlled by $\emptyset_2$ are OFF to isolate the $\emptyset_1$ and $\emptyset_2$ capacitors. Unit cell inputs 42, 44, and 46 inject their respective signals into the drain connected side of the capacitors gates controlled by clock phase $\emptyset_1$, namely the capacitors of elements 53, 57, and 61. This is done by any of various techniques, from charge sharing to Thompsett type injection. $\emptyset_1$ is then appropriately clocked in order to transfer and add the stored charge in the $\emptyset_2$ controlled capacitors. Charge stored in the capacitors of elements 52, 56, and 60 are added to the capacitors in 53, 57, and 61, respectively, and the charge stored in the capacitors of 54 and 59 are just transferred to capacitors in 55 and 60, respectively. $\emptyset_1$ is clocked OFF. $\emptyset_2$ is then appropriately clocked in order to transfer the accumulated charge in the $\emptyset_1$ controlled capacitors to the $\emptyset_2$ controlled capacitors. The charge in the capacitors of 51, 53, 55, 57, 59, and 61 are transferred and stored on the capacitors in 52, 54, 56, 58, 60, and 62, respectively. During this process, the capacitors of 51, 53, 55, 57, 59, and 61 are also automatically reset. $\varnothing_1$ is clocked OFF. The addition, transfer, and storage cycle is complete and the summed charges are now stored in the capacitors controlled by $\varnothing_2$. The screen gates serve to improve the charge transfer efficiency. The BBD described above is suitable for a 2-sample per dwell implementation.

Figure 3:
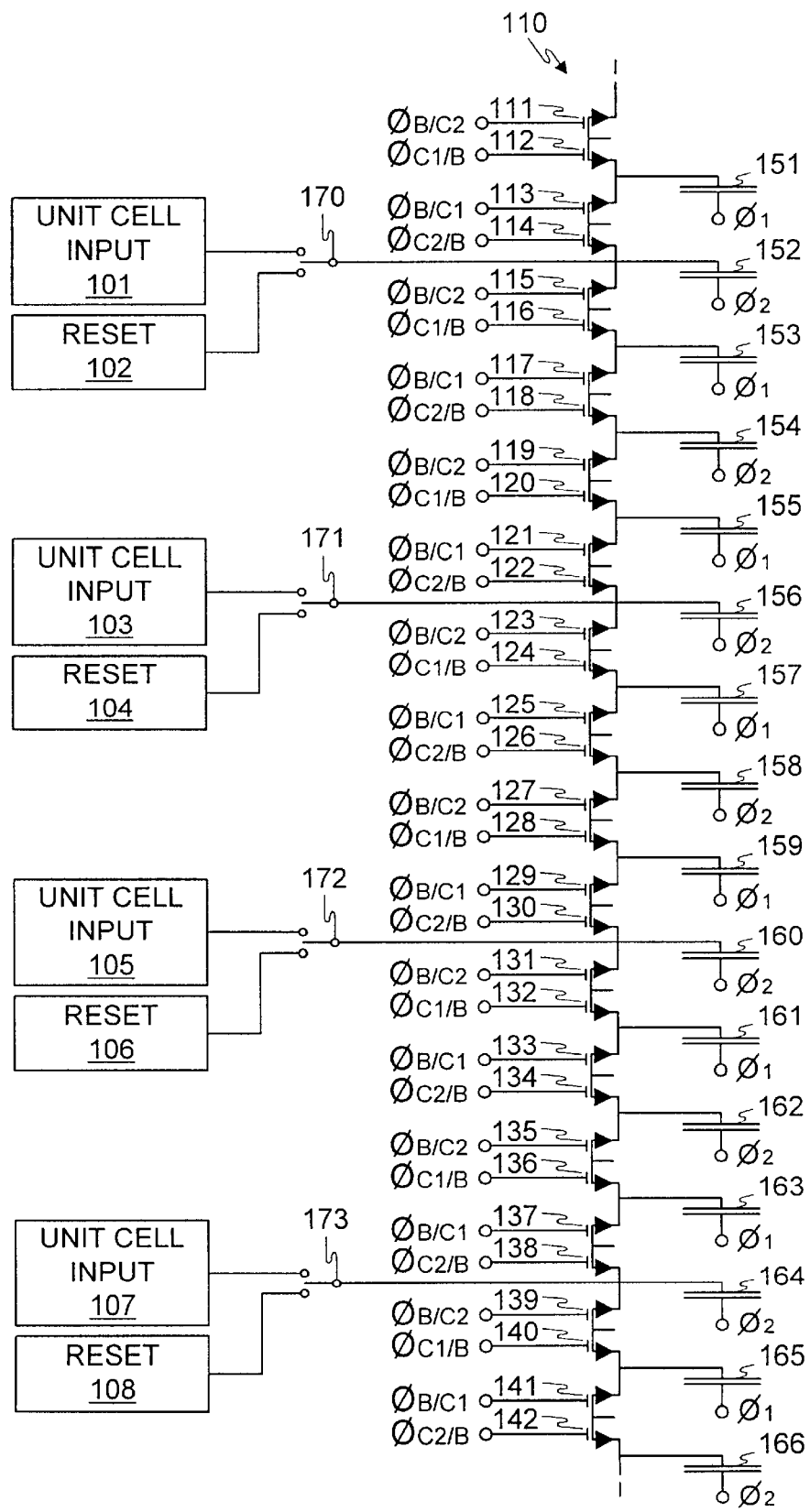
FIG. 3 is a circuit diagram of a bi-directional bucket brigade circuit for a two sample per dwell TDI, in accordance with the present invention.

FIG. 3 shows a representative segment of a bi-directional BBD circuit 110, which performs an SCA TDI with reduced ROIC circuitry. The reduction in the ROIC circuitry is achievable because the required area for the charge transfer device is reducible by approximately 50 percent relative to CCDs with switched inputs. CCDs with switched inputs require injection circuits that are clocked in a particular order depending on scan direction. The bi-directional BBD does not require this circuitry, where charge is injected directly by the unit cell, and allows reductions in the overall ROIC area of about 20 percent or more. Moreover, clock and bias generation both on the SCA and off of the SCA is reducible, and compatibility with standard LSI processing is preserved inasmuch as the specialized processing for the two level polysilicon structures used in CCD implementation is not required. Performance is similar to CCD implementations.

Four representative unit cell inputs 101, 103, 105 and 107 are shown in FIG. 3, along with respective switches 170, 171, 172 and 173, which preferably are transistor switches. The segment 110 has numerous pairs of MOSFET transistors connected in series and numerous storage capacitors having one of their terminals respectively connected between each of the MOSFET pairs and the other of their terminals alternately connected to clock phases $\varnothing_1$ and $\varnothing_2$. The gates of the two MOSFETs in each pair are separated from the clock phases $\varnothing_1$ and $\varnothing_2$ and function respectively as screen gate and transfer clock for one direction of charge flow, and as transfer clock and screen gate for the other direction of charge flow. Transfer direction is changed by switching which MOSFET in a pair becomes clocked as a transfer gate and which becomes a screen gate. Advantageously, the presence of a screen gate in the charge transfer path increases the transfer efficiency of the bucket brigade device in both directions, which is desirable for operating scanning IR SCAs where TDI is performed on-chip.

The signal convention used in FIG. 3 for the gates of the various MOSFETS of the bidirectional BBD circuit 110 is as follows. The first symbol in the signal $\varnothing$ subscript indicates the function of the gate in the DOWN direction, the second symbol in the signal $\varnothing$ subscript indicates the function of the gate in the UP direction. The symbol "B" represents a screen voltage, the symbol "C1" represents capacitor clock phase $\varnothing_1$, and symbol "C2" represents capacitor clock phase $\varnothing_2$.

In the following description of the operation of the bi-directional BBD circuit 110, charge at a node is represented by a letter indicating the image sample that the detector starts at, and the parenthetical numerical values indicate the TDI number. FIGS. 4 and 5 show transfers in the DOWN direction, with MOS transistors 111, 113, 115, 117, 119, 121, 123, 125, 127, 129, 131, 133, 135, 137, 139 and 141 having their gates at screen potential. The bidirectional BBD circuit 110 is suitable for a two sample per dwell SCA, and FIG. 4 pertains to the first sample of charges A(4), C(3), E(2) and G(1) while FIG. 5 pertains to the second sample of charges B(4), D(3), F(2) and H(1). If desired, the bidirectional BBD circuit 110 may be made suitable for a single sample per dwell SCA by reducing the number of the MOS transistor pairs between adjacent unit cell inputs to two, or may be made suitable for more than two samples per dwell by adding additional MOS transistor pairs between adjacent unit cell inputs.

FIG. 4 shows illustrative initial conditions on the capacitors 151–166 at time to when the capacitors 152, 156, 160 and 164 are connected to reset circuits 102, 104, 106 and 108 through switches 170, 171, 172 and 173 respectively. At time ti , input charges G(1), E(2), C(3) and A(4) from the first sample set are available on unit cell inputs 101, 103, 105 and 107 and are transferred to capacitors 152, 156, 160 and 164 through switches 170, 171, 172 and 173 respectively. At time $t_2$, MOS transistors 114, 118, 122, 126, 130, 134, 138 and 142 are clocked ON by clock phase $\varnothing_2$ so that charge is transferred from capacitor 151 and added to the input charge stored in capacitor 152, transferred from capacitor 153 to capacitor 154, transferred from capacitor 155 and added to the input charge stored in capacitor 156, transferred from capacitor 157 to capacitor 158, transferred from capacitor 159 and added to the input charge stored in capacitor 160, transferred from capacitor 161 to capacitor 162, transferred from capacitor 163 and added to the input charge stored in capacitor 164, and transferred from capacitor 165 to capacitor 166. MOS transistors 112, 116, 120, 124, 128, 132, 136 and 140 are OFF by clock phase $\varnothing_1$ so that the transferred and accumulated charges are isolated. At time $t_3$, MOS transistors 116, 120, 124, 128, 132, 136 and 140 are clocked ON by clock phase $\varnothing_1$ so that charge is transferred from capacitor 152 to capacitor 153, from capacitor 154 to capacitor 155, from 156 to capacitor 157, from capacitor 158 to capacitor 159, from capacitor 160 to capacitor 161, from capacitor 162 to capacitor 163, and from capacitor 164 to capacitor 165. MOS transistors 114, 118, 122, 126, 130, 134, 138 and 142 are OFF by clock phase $\varnothing_2$ so that the transferred and accumulated charges are isolated.

FIG. 5 shows the initial conditions on the capacitors 151–166 at time $t_4$ when the capacitors 152, 156, 160 and 164 are connected to reset circuits 102, 104, 106 and 108 through switches 170, 171, 172 and 173 respectively. At time $t_5$, input charges H(1), F(2), D(3) and B(4) from the second sample set are available on unit cell inputs 101, 103, 105 and 107 and are transferred to capacitors 152, 156, 160 and 164 through switches 170, 171, 172 and 173 respectively. At time $t_6$, MOS transistors 114, 118, 122, 126, 130, 134, 138 and 142 are clocked ON by clock phase $\varnothing_2$ SO that charge is transferred from capacitor 151 and added to the input charge stored in capacitor 152, transferred from capacitor 153 to capacitor 154, transferred from capacitor 155 and added to the input charge stored in capacitor 156, transferred from capacitor 157 to capacitor 158, transferred from capacitor 159 and added to the input charge stored in capacitor 160, transferred from capacitor 161 to capacitor 162, transferred from capacitor 163 and added to the input charge stored in capacitor 164, and transferred from capacitor 165 to capacitor 166. MOS transistors 112, 116, 120, 124, 128, 132, 136 and 140 are OFF by clock phase $\varnothing_1$ so that the transferred and accumulated charges are isolated. At time $t_7$, MOS transistors 116, 120, 124, 128, 132, 136 and 140 are clocked ON by clock phase $\varnothing_1$ so that charge is transferred from capacitor 152 to capacitor 153, from capacitor 154 to capacitor 155, from 156 to capacitor 157, from capacitor 158 to capacitor 159, from capacitor 160 to capacitor 161, from capacitor 162 to capacitor 163, and from capacitor 164 to capacitor 165. MOS transistors 114, 118, 122, 126, 130, 134, 138 and 142 are OFF by clock phase $\varnothing_2$ so that the transferred and accumulated charges are isolated.

In the following description of the operation of the bi-directional BBD circuit 110, transfer is changed to the UP direction. This is achieved by placing the gates of MOS transistors 112, 114, 116, 118, 120, 122, 124, 126, 128, 130, 132, 134, 136, 138, 140 and 142 at screen potential.

FIG. 6 shows the initial conditions on the capacitors 151–166 at time to when the capacitors 152, 156, 160 and 164 are connected to reset circuits 102, 104, 106 and 108 through switches 170, 171, 172 and 173 respectively. At time $t_1$, input charges G(1), E(2), C(3) and A(4) from the first sample set are available on unit cell inputs 107, 105, 103 and 101 and are transferred to capacitors 164, 160, 156 and 152 through switches 173, 172, 171 and 170 respectively. At time $t_2$, MOS transistors 139, 135, 131, 127, 123, 119, 115 and 111 are clocked ON by clock phase $\emptyset_2$ SO that charge is transferred from capacitor 165 and added to the input charge stored in capacitor 164, transferred from capacitor 163 to capacitor 162, transferred from capacitor 161 and added to the input charge stored in capacitor 160, transferred from capacitor 159 to capacitor 158, transferred from capacitor 157 and added to the input charge stored in capacitor 156, transferred from capacitor 155 to capacitor 154, transferred from capacitor 153 and added to the input charge stored in capacitor 152. MOS transistors 141, 137, 133, 129, 125, 121, 117 and 113 are OFF by clock phase $\emptyset_1$ so that the transferred and accumulated charges are isolated. At time $t_3$, MOS transistors 141, 137, 133, 129, 125, 121, 117 and 113 are clocked ON by clock phase $\emptyset_1$ so that charge is transferred from capacitor 166 to capacitor 165, from capacitor 164 to capacitor 163, from capacitor 162 to capacitor 161, from capacitor 160 to capacitor 159, from capacitor 158 to capacitor 157, from capacitor 156 to capacitor 155, from capacitor 154 to capacitor 153, and from capacitor 152 to capacitor 151. MOS transistors 139, 135, 131, 127, 123, 119, 115 and 111 are OFF by clock phase $\emptyset_2$ SO that the transferred and accumulated charges are isolated.

Figure 8:
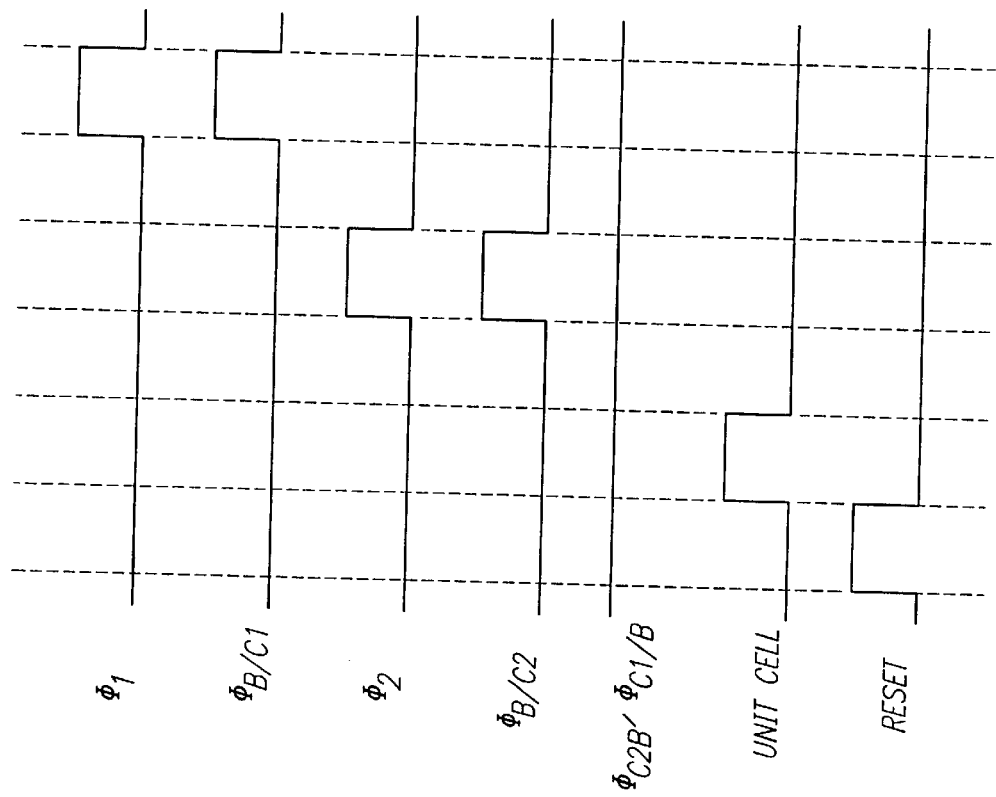
FIGS. 7–8 are waveform diagrams useful in understanding the operation of the circuit of FIG. 3.
Figure 7:
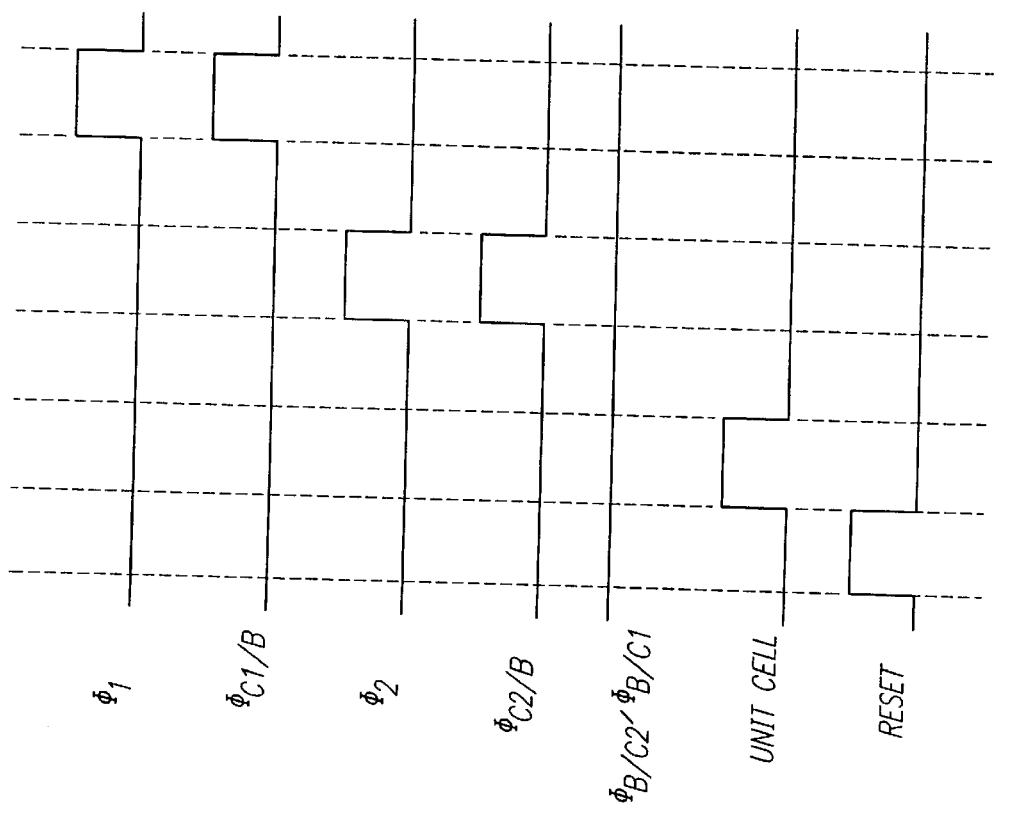

FIGS. 7 and 8 have been added to illustrate the various control and clock phase signals. FIG. 7 shows the timing of the clock signals for scanning in the DOWN direction. FIG. 8 shows the timing for scanning in the UP direction.

The bi-directional techniques used in the BBD circuit 110 may be used with multiplexed BBD circuits such as described in commonly assigned U.S. patent application Ser. No. 09/479,689 (Application of Hewitt et al. entitled "Multiplex Bucket Brigade Circuit," filed Jan. 9, 2000, which hereby is incorporated herein by reference in its entirety.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications, and embodiments within the scope of the present invention.

Accordingly,

What is claimed is:

1. A time delay integration circuit comprising:
    a plurality of serially coupled circuit groups, each comprising at least:
        a first charge transfer path segment having a first gate and a second gate in series between a first end and a second end thereof;
        a second charge transfer path segment having a first gate and a second gate in series between a first end and a second end thereof, the first end of the second charge transfer path being coupled to the second gate of the first charge transfer path;
        a first capacitor having a first terminal coupled to the first end of the first charge transfer path segment and a second terminal; and
        a second capacitor having a first terminal coupled to the first end of the second charge transfer path segment and a second terminal;
    a plurality of imaging sensor unit cell inputs respectively controllably coupled to the first terminals of the second capacitors;
    a screen voltage node controllably coupled in a first circuit mode to the first gates and in a second circuit mode to the second gates;
    a first phase clock node coupled to the second terminals of the first capacitors and controllably coupled in the first circuit mode to the second gates of the second charge transfer path segments and in the second circuit mode to the first gates of the first charge transfer path segments; and
    a second phase clock node coupled to the second terminals of the second capacitors and controllably coupled in the first circuit mode to the second gates of the first charge transfer path segments and in the second circuit mode to the first gates of the second charge transfer path segments.

2. A time delay integration circuit as in claim 1 further comprising a plurality of reset inputs respectively controllably coupled to the first terminals of the second capacitors.

3. A time delay integration circuit as in claim 2 further comprising a plurality of switch circuits having pole terminals respectively coupled to the second capacitors, first switched terminals respectively coupled to the imaging sensor unit cell inputs, and second switched terminals respectively coupled to the reset inputs.

4. A time delay integration circuit as in claim 3 wherein the switch circuits are MOSFET transistor switch circuits.

5. A time delay integration circuit as in claim 1 further comprising a plurality of serially coupled MOSFET transistors, the first and second gates being gates of the MOSFET transistors.

6. A two sample per dwell time delay integration circuit comprising:
    a plurality of serially coupled circuit groups, each comprising:
        a first charge transfer path segment having a first gate and a second gate in series between a first end and a second end thereof;
        a first capacitor having a first terminal coupled to the first end of the first charge transfer path segment and a second terminal;
        a second charge transfer path segment having a first gate and a second gate in series between a first end and a second end thereof, the first end of the second charge transfer path being coupled to the second end of the first charge transfer path;
        a second capacitor having a first terminal coupled to the first end of the second charge transfer path segment and a second terminal;
        a third charge transfer path segment having a first gate and a second gate in series between a first end and a second end thereof, the first end of the third charge transfer path being coupled to the second end of the second charge transfer path;

a third capacitor having a first terminal coupled to the first end of the third charge transfer path segment and a second terminal;

a fourth charge transfer path segment having a first gate and a second gate in series between a first end and a second end thereof, the first end of the fourth charge transfer path being coupled to the second end of the third charge transfer path; and a fourth capacitor having a first terminal coupled to the first end of the fourth charge transfer path segment and a second terminal;

a plurality of imaging sensor unit cell inputs respectively controllably coupled to the first terminals of the second capacitors;

a screen voltage node controllably coupled in a first circuit mode to the first gates and in a second circuit mode to the second gates;

a first phase clock node coupled to the second terminals of the first and third capacitors and controllably coupled in the first circuit mode to the second gates of the second and fourth charge transfer path segments and in the second circuit mode to the first gates of the first and third charge transfer path segments; and a second phase clock node coupled to the second terminals of the second and fourth capacitors and controllably coupled in the first circuit mode to the second gates of the first and third charge transfer path segments and in the second circuit mode to the first gates of the second and fourth charge transfer path segments.

7. A time delay integration circuit as in claim 6 further comprising a plurality of reset inputs respectively controllably coupled to the first terminals of the second capacitors.

8. A time delay integration circuit as in claim 7 further comprising a plurality of switch circuits having pole terminals respectively coupled to the second capacitors, first switched terminals respectively coupled to the imaging sensor unit cell inputs, and second switched terminals respectively coupled to the reset inputs.

9. A time delay integration circuit as in claim 8 wherein the switch circuits are MOSFET transistor switch circuits.

10. A time delay integration circuit as in claim 6 further comprising a plurality of serially coupled MOSFET transistors, the first and second gates being gates of the MOSFET transistors.

11. A method of time delay integration of image sensor charges, comprising:

storing a charge on a first capacitor;

acquiring a first image sensor charge;

transferring the first image sensor charge to a second capacitor;

transferring the charge on the first capacitor from the first capacitor to the second capacitor in a first direction along a first charge transfer path to add the charge on the first capacitor to the first image sensor charge, thereby obtaining a first accumulated charge;

transferring the first accumulated charge from the second capacitor to a third capacitor in the first direction along a second charge transfer path to store the first accumulated charge;

acquiring a second image sensor charge, the second image sensor charge being a time delayed version of the first image sensor charge;

transferring the second image sensor charge to a fourth capacitor;

transferring the first accumulated charge from the third capacitor to the fourth capacitor in the first direction along a third charge transfer path to add the first accumulated charge to the second image sensor charge, thereby obtaining a second accumulated charge; and transferring the second accumulated charge from the fourth capacitor to a fifth capacitor in the first direction along a fourth charge transfer path to store the second accumulated charge.

12. A method as in claim 11 wherein:

the step of acquiring first image sensor charge comprises acquiring a first charge from an imaging array at a first time; and the step of acquiring second image sensor charge comprises acquiring a second charge from the imaging array at a second time delayed from the first time.

13. A method as in claim 11 wherein:

the step of transferring first image sensor charge comprises coupling the second capacitor to a unit cell input at a first time; and the step of transferring second image sensor charge comprises coupling the fourth capacitor to the next unit cell input at a second time delayed from the first time.

14. A method as in claim 11 wherein the step of transferring the charge on the first capacitor from the first capacitor to the second capacitor comprises:

applying a screen voltage to a first MOSFET gate in the first charge transfer path; and applying an ON voltage from a first transfer clock to a second MOSFET gate in the first charge transfer path.

15. A method as in claim 14 wherein the step of transferring the first accumulated charge from the second capacitor to the third capacitor comprises:

applying the screen voltage to a first MOSFET gate in the second charge transfer path; and applying an ON voltage from a second transfer clock to a second MOSFET gate in the second charge transfer path.

16. A method as in claim 15 wherein the step of transferring the first accumulated charge from the third capacitor to the fourth capacitor comprises:

applying the screen voltage to a first MOSFET gate in the third charge transfer path; and applying the ON voltage from the first transfer clock to a second MOSFET gate in the first charge transfer path.

17. A method as in claim 16, wherein the step of transferring the second accumulated charge from the fourth capacitor to the fifth capacitor comprises:

applying the screen voltage to a first MOSFET gate in the fourth charge transfer path; and applying the ON voltage from the second transfer clock to a second MOSFET gate in the fourth charge transfer path.

18. A method as in claim 17 further comprising applying the first transfer clock to the second and fourth capacitors and the second transfer clock to the first and third capacitors.

19. A method as in claim 11 further comprising:

storing a charge on the fifth capacitor;

acquiring a third image sensor charge;

transferring the third image sensor charge to the fourth capacitor;

transferring the charge on the fifth capacitor from the fifth capacitor to the fourth capacitor in a second direction along the fourth charge transfer path to add the charge on the fifth capacitor to the third image sensor charge, thereby obtaining a third accumulated charge;

transferring the third accumulated charge from the fourth capacitor to a third capacitor in the second direction along the third charge transfer path to store the third accumulated charge;

acquiring a fourth image sensor charge, the fourth image sensor charge being a time delayed version of the third image sensor charge;

transferring the fourth image sensor charge to the second capacitor;

transferring the third accumulated charge from the third capacitor to the second capacitor in the second direction along the second charge transfer path to add the third accumulated charge to the fourth image sensor charge, thereby obtaining a fourth accumulated charge; and transferring the fourth accumulated charge from the second capacitor to the first capacitor in the second direction along the first charge transfer path to store the fourth accumulated charge.

20. A method as in claim 11 wherein:

the step of acquiring third image sensor charge comprises acquiring a third charge from the imaging array at a third time different than the first and second times; and the step of acquiring fourth image sensor charge comprises acquiring a fourth charge from the imaging array at a fourth time delayed from the third time and different than the first and second times.

\* \* \* \* \*